United States Patent [19]

Holowczak et al.

[11] Patent Number: 5,470,222

[45] Date of Patent: Nov. 28, 1995

[54] HEATING UNIT WITH A HIGH EMISSIVITY, POROUS CERAMIC FLAME HOLDER

[75] Inventors: John E. Holowczak, South Windsor; Martin F. Zabielski, Manchester, both of Conn.

[73] Assignee: United Technologies Corporation, Hartford, Conn.

[21] Appl. No.: 79,760

[22] Filed: Jun. 21, 1993

[51] Int. Cl.$^6$ .................................................. F23D 14/12
[52] U.S. Cl. ............................................ 431/7; 431/328
[58] Field of Search .......................... 431/7, 328, 329

[56] References Cited

U.S. PATENT DOCUMENTS

| | | | |
|---|---|---|---|
| 3,179,156 | 4/1965 | Weiss et al. | 158/116 |
| 3,191,659 | 6/1965 | Weiss | 158/116 |
| 3,275,497 | 9/1966 | Weiss et al. | 162/103 |
| 3,561,902 | 2/1971 | Best | 431/328 |
| 4,643,667 | 2/1987 | Fleming | 431/7 |
| 4,673,349 | 6/1987 | Abe et al. | 431/328 |
| 4,708,740 | 11/1987 | Tungatt et al. | 75/76 |
| 4,721,456 | 1/1988 | Granberg et al. | 431/328 |
| 4,722,681 | 2/1988 | Smith | 431/7 |
| 4,737,102 | 4/1988 | Jinno et al. | 431/328 |
| 4,789,506 | 12/1988 | Kasprzyk | 264/25 |
| 4,828,481 | 5/1989 | Weil et al. | 431/7 |
| 4,878,837 | 11/1989 | Otto | 431/328 |
| 4,889,481 | 12/1989 | Morris et al. | 431/328 |
| 4,895,513 | 1/1990 | Subherwal | 431/328 |
| 4,906,178 | 3/1990 | Goldstein et al. | 431/328 |
| 5,147,201 | 9/1992 | Xiong | 431/326 |

FOREIGN PATENT DOCUMENTS

| | | |
|---|---|---|
| 0056757A2 | 7/1982 | European Pat. Off. |
| 0228631A2 | 7/1987 | European Pat. Off. |
| 0369330A3 | 5/1990 | European Pat. Off. |
| 0410569A1 | 1/1991 | European Pat. Off. |
| 1303596 | 5/1972 | Germany. |
| 62-166212 | 7/1987 | Japan ................ F23D 14/14 |

OTHER PUBLICATIONS

Patent Abstracts of Japan, vol. 12, No. 1 (M–656) 6 Jan. 1988 & JP,A,62 166 212 (Miura Co Ltd) 22 Jul. 1987.

Manufacturer's literature entitled, "Refractron Technologies world's largest dedicated producer of ceramic aerators and diffusers", publication date unknown, three unnumbered pages.

Manufacturer's literature entitled, "Refraction Corporation–Product Data–The Quality Standard–Industrial Ceramics Division–Product: Refractron Aluminum Oxide Permeable Media" dated Aug. 1985, six unnumbered pages.

Manufacturer's literature entitled, "Refractron Filter Capabilities as of Apr. 19, 1990" four unnumbered pages.

Paper entitled, "Particle Size Effects on High–temperature Dust Cake Filtration from a Coal–fired Atmospheric Fludized–bed Combustor" by Richard A. Dennis, Larry D. Strickland, Ta–Kuan Chiang, United States Department of Energy, publication data unknown and consisting of six unnumbered pages.

Excert from Gas Research Institute report, publication data unknown, pp. 4–47 through 4–56.

*Primary Examiner*—Carroll B. Dority

[57] ABSTRACT

A heating unit (14) includes a flame holder (2) that has a plurality of randomly distributed pores and comprises at least about 50 wt % ceramic particles that have an emissivity of at least about 0.7. The heating unit (14) also has means for conveying a fuel/air mixture to the flame holder (2), means (18) for igniting the fuel/air mixture so it forms a flame in proximity to the flame holder, means (20) for transferring heat from the flame to a heat transfer medium, and means (26) for exhausting combustion products from the heating unit. A fuel/air mixture may be directed through the flame holder (2) and burned to form a flame in proximity to the flame holder such that the flame and flame holder interact to produce emissions of less than about 10 ng/J $NO_x$.

18 Claims, 1 Drawing Sheet

HEATING UNIT WITH A HIGH EMISSIVITY, POROUS CERAMIC FLAME HOLDER

TECHNICAL FIELD

The present invention is directed to a heating unit with a ceramic flame holder that burns fuels with low pollutant emissions.

BACKGROUND ART

Flame holders, also known as burners, are used in heating units to produce stable, evenly distributed flames without flashback or burnback. Flameholder design has a large impact on heating unit performance. Over the years, many different flame holder designs have been used or proposed. Especially in residential heating units, flame holder design has typically emphasized low manufacturing cost, durability and, for induced draft heating units, low pressure drop.

Durability is an important consideration because of the harsh environment inside a heating unit. Over its lifetime, a flame holder is exposed to thousands of thermal cycles, high temperatures, and the corrosive effects of combustion products such as nitric and carbonic acids. A durable flame holder allows a heating unit to operate reliably for long periods with low maintenance costs.

In induced draft heating units, fuel and combustion air are drawn through the flame holder by a fan located downstream of the combustion chamber. The size of the fan and related motor needed to move the fuel and air depend in large part on the pressure drop across the flame holder. To minimize fan and motor size, a low pressure drop flame holder is desirable. For example, a flame holder used in a residential, gas-fired, induced draft heating unit typically has a pressure drop less than 250 Pa (1 inch of water).

With the renewed focus on environmental issues, the impact of flame holder design on pollutant emissions is becoming an important consideration. Future flame holders will need to produce low levels of pollutants, such as CO and $NO_x$, while still providing the desired durability and low pressure drop.

Therefore, what is needed in the industry is a heating unit with a durable, low pressure drop flame holder that produces low pollutant emissions.

DISCLOSURE OF THE INVENTION

The present invention is directed to a heating unit with a durable, low pressure drop flame holder that produces low pollutant emissions.

One aspect of the invention includes a heating unit with a flame holder that has a plurality of randomly distributed pores and comprises at least about 50 wt % ceramic particles that have an emissivity of at least about 0.7. The heating unit also has means for conveying a fuel/air mixture to the flame holder, means for igniting the fuel/air mixture so it forms a flame in proximity to the flame holder, means for transferring heat from the flame to a heat transfer medium, and means for exhausting combustion products from the heating unit.

Another aspect of the invention includes a method for burning a fuel by directing a fuel/air mixture through a flame holder that has a plurality of randomly distributed pores. The flame holder comprises at least about 50 wt % ceramic particles that have an emissivity of at least about 0.7. The fuel/air mixture is burned to form a flame in proximity to the flame holder such that flame and flame holder interact to produce emissions of less than about 10 ng/J $NO_x$.

These and other features and advantages of the present invention will become more apparent from the following description and accompanying drawing.

BEST MODE FOR CARRYING OUT THE INVENTION

Figure 1:
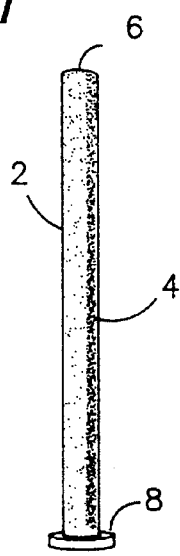
FIG. 1 is a perspective view of a flame holder of the present invention.

The heating unit of the present invention includes a flame holder made from a highly porous ceramic material that comprises at least about 50 weight percent (wt %) of ceramic particles that have an emissivity of at least about 0.7. Preferably, the ceramic particles in the flame holder will have an emissivity of at least about 0.8 and, most preferably, at least about 0.9. Suitable ceramic particles include SiC, $Si_3N_4$, $SiO_2$, TiC, NiO, FeO, $Fe_2O_3$, and mixtures thereof. SiC particles are preferred because they impart excellent thermal shock resistance to the flame holder, which allows it to withstand frequent and repeated thermal cycling. The ceramic particles may have any grain size consistent with the average pore size and porosity discussed below. For example, the ceramic particles may have a grain size between about 20 μm and about 300 μm.

The ceramic particles in the flame holder may be bonded together with other ceramic, crystalline phases including, but not limited to, mullite, cordierite, lithium aluminosilicate, titanium silicates, borosilicates, yttrium aluminosilicates, or barium osumilite; low thermal expansion glasses that are similar to crystalline phases such as lithium aluminosilicate, magnesium aluminosilicate, aluminosilicate, titanium silicates, borosilicates or yttrium aluminosilicates; or mixtures thereof. For example, about 70% SiC can be bonded with about 30% mullite. In addition, the ceramic particles may be "self bonded" or recrystallized. Self bonded materials have grains that are joined by surface diffusion, preliminary sintering, or both. SiC particles may be self bonded by compacting and heating them to a temperature above 1600° C.

The flame holder may have one or more layers of porous ceramic material and may have a porosity of about 30% to about 60%. Preferably, the porosity will be between about 40% and about 55% and will be nearly completely interconnected. The pores should be randomly distributed over the flame holder's surface. A flame holder with one layer of ceramic porous material may have an average pore size of about 5 μm to about 300 μm. The pore size for a particular application should be selected in conjunction the wall thickness of the flame holder to provide acceptable pressure drop and structural strength. To provide a pressure drop less than 250 Pa, a single-layer flame holder may have an average pore size of at least about 30 μm and a wall thickness of less than about 4 mm. Excellent results have been obtained with an average pore size of about 50 μm and a wall thickness of less than 2.5 mm. Other combinations of pore size and wall thickness may be acceptable for a variety of design conditions. A flame holder with two layers of ceramic material may have a coarse inner layer with an average pore size of about 30 μm to about 300 μm and a fine outer layer with an average pore size of about 2 μm to about 60 μm. As with a single-layered flame holder, the pore size of each layer should be selected in conjunction with the thickness of each layer to provide acceptable pressure drop and structural strength.

Figure 2:
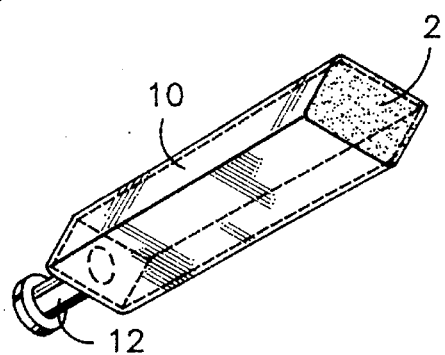
FIG. 2 is a perspective view of another flame holder of the present invention.

The flame holder 2 of the present invention may have any appropriate shape. For example, the flame holder 2 may be a closed-ended tube 4 as shown in FIG. 1. Preferably, a tubular flame holder will have a length to diameter ratio of at least about 2:1 to spread combustion over a larger area and help prevent flashbacks. Depending of the location of the flame holder 2 in a heating unit and the design of the heating unit's heat exchanger, the closed end 6 of the tube 4 may have more of the bonding phase than the rest of the tube to close the pores in the closed end completely. The tube 4 may have a flange 8 to facilitate mounting the flame holder 2 inside a heating unit. Alternately, the flame holder 2 may be a rectangular ceramic plate positioned in a slant burner as shown in FIG. 2. The slant burner includes a metal duct 10 that conveys a fuel/air mixture to the flame holder 2 and a pipe fitting 12 to facilitate mounting inside a heating unit. As required by a particular application, the flame holder 2 also may be an open-ended tube, a plate, a disc, or some other shape. The flame holder should be sized for the heat load and heat exchanger configuration anticipated for a particular application.

The flame holder 2 of the present invention may be made with well-known, conventional ceramic techniques or may be purchased from a suitable vendor. For example, suitable materials may be purchased from the Industrial Ceramics Division of Refractron Corporation (Newark, N.Y.). We found that Refractron's SiC Refractite I™ filter, originally designed to remove solids from coal gases, works exceptionally well as a flame holder. The Refractite I™ filters are made from a single layer of SiC-based ceramic material and are available with average pore sizes between 5 μm and 300 μm. Refractron's SiC Refractite II™ filters are two-layer structures that have a fine outer layer (average pore size 3.5 μm to 50 μm) surrounding a coarser inner layer (average pore size 50 μm to 140 μm). Both the Refractite I™ and Refractite II™ filters may be purchased in a variety of standard sizes and shapes (including closed-ended tubes, open-ended tubes, plates, or discs). The filters also may be custom produced in different sizes with different pore sizes. The SiC-based material in the Refractron filter has a modulus of rupture of about 10 MPa (1.5 ksi) to about 28 MPa (4 ksi), a coefficient of thermal expansion of $4.5 \times 10^{-6}$ °C$^{-1}$, and excellent thermal shock resistance. The thermal shock resistance of the SiC-based material was assessed by heating the material to about 1000° C. and immediately exposing it to room temperature air blasts ("air quenching"). The SiC-based material survived at least 10 cycles of this test without cracking.

The flame holder 2 of the present invention may be mounted in a heating unit by any suitable means. The particular means used is not critical. For example, a flanged tubular flame holder 2 may be clamped to the heating unit. If the flame holder 2 is a plate or a disc, it can be mounted with clips or any other mounting devices known in the art.

Figure 3:
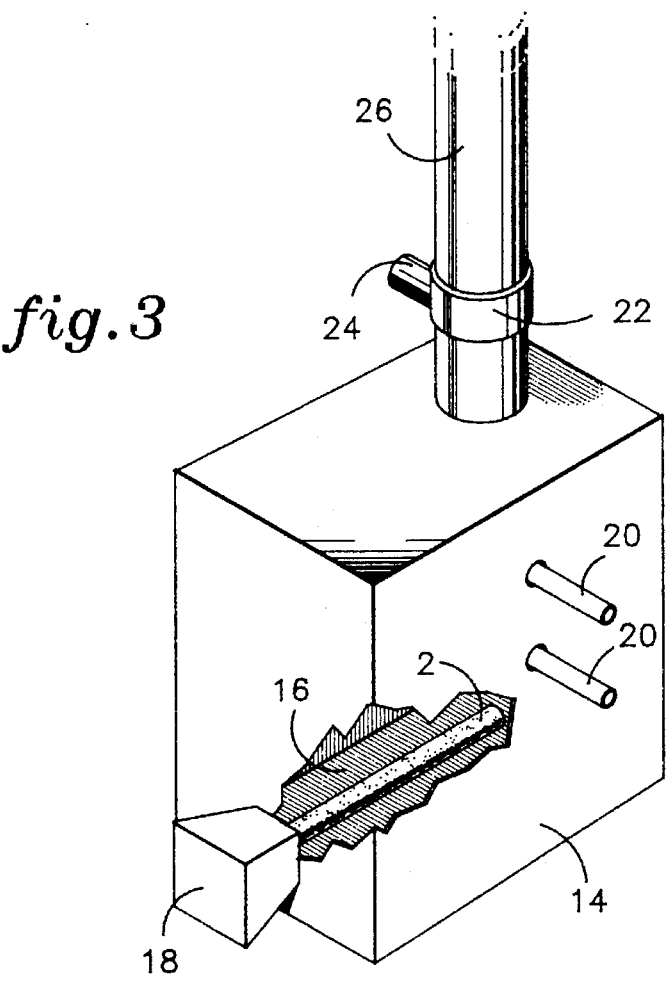
FIG. 3 is a partially cut away, perspective view of a heating unit of the present invention.

FIG. 3 shows how a flame holder 2 of the present invention might be installed inside an induced draft heating unit 14. The flame holder 2 may be positioned so it extends inside the heating unit's firebox 16. The heating unit 14 may incorporate means for conveying a fuel/air mixture to the flame holder and means for igniting the fuel/air mixture so it forms a flame in proximity to the flame holder in any conventional way. Both means, shown generically by box 18, may be any conventional devices, such as a combination of ducts and a spark ignitor, pilot, or hot surface ignitor. The heating unit 14 also should incorporate means for transferring heat from a flame in the combustion chamber 16 to a heat transfer medium. Again, these means can be conventional, such as lines 20 that lead to and from a heat exchanger (not shown) inside the heating unit 14. A fan 22 and fan motor 24 located in the flue 26 create a partial vacuum inside the combustion chamber 16 that draws the fuel/air mixture into the heating unit 14 and combustion products out of the heating unit. A similar arrangement with a suitably located fan may be used to mount the flame holder of the present invention in a forced draft heating unit.

The flame holder of the present invention may be used over a range of combustion conditions and in different types of heating units. The flame holder has been tested under blue flame and infrared combustion conditions. Blue flame conditions are characterized by a visible flame (CH emission at 431 nm) with a flame holder surface temperature that is typically about 260° C. or less. When the flame holder operates in a blue flame mode, the flame resides above the surface of the flame holder. Infrared conditions are characterized by a nearly invisible flame with flame holder surface temperatures of about 925° C. to about 1150° C. In the infrared mode, the flame resides at and below the surface of the flame holder. The ceramic particles in the flame holder absorb the heat of combustion and radiate it in the infrared region. The mode of operation is determined by the stoichiometry of the combustion. To operate in the blue flame mode, the fuel should be burned with about 45% or more excess air. To operate in the infrared mode, the fuel is burned with up to about 40% excess air. Preferably, the flame holder will be used with gaseous fuels such as hydrogen, natural gas, methane, propane, butane, or any other gaseous fuel. If the surface of the flame holder is heated or is sufficiently hot from radiation or convection/conduction back to the surface of the flame holder, the flame holder may be compatible with prevaporized liquid fuels. For example, the flame holder also may be used with prevaporized liquid fuels such as number 1 and number 2 fuel oils and other liquid fuels that can be prevaporized.

The following examples demonstrate the present invention without limiting the invention's broad scope.

Example 1

A closed-end, flanged, tubular SiC Refractite I™ candle filter (grade SF 42) was purchased from the Industrial Ceramics Division of Refractron Corporation (Newark, N.Y.) for use as a flame holder. The flame holder was 36 cm long and had an inside diameter of 12.5 mm (0.49 inch), a wall thickness of 3.9 mm (0.16 inch), an average pore size of 30 μm, and a porosity of 46%. The flame holder was attached to a coil of copper tubing and was placed inside a water-cooled, steel stack to simulate the heat exchanger in a forced air home heating unit. Natural gas and compressed air were metered through choked, calibrated orifices into the copper tubing where they mixed and flowed into the inside diameter of the flame holder. Initially, the flame holder was operated in blue flame conditions. Later the air flow rate was decreased to move the flame holder into infrared conditions. Under infrared conditions the surface of the flame holder, as measured with an optical pyrometer calibrated for SiC, was about 1120° C. (2050° F.). This temperature corresponded to a thermal loading of 1102 MJ/m$^2$/hr (97,000 Btu/ft$^2$/hr), a fuel flow rate of 0.465 g-mol/min (0.365 standard ft$^3$/min (scfm)), and 27% excess air. No flashback or burnback occurred during about 1.5 hr of operation under these conditions. Emissions from the flame holder were observed at thermal loadings of 1102 MJ/m$^2$/hr and 700 MJ/m$^2$/hr (62,000 Btu/ft$^2$/hr) (corresponding to a fuel flow rate of 0.294 g-mol/min (0.231 scfm)) at assumed thermal efficiencies of 80%. At each thermal loading, the fuel flow rate was held constant and the air flow rate was varied. Representative data are reported in Table 1. Pressure drops for this flame holder measured at room temperature and 700 MJ/m$^2$/hr are reported in Table 3.

TABLE 1

| Heat Load MJ/m$^2$/hr | Excess Air* % | NO$_x$ ng/J | NO$_x$ @ 3% O$_2$ ppm |
|---|---|---|---|
| 700 | 42 | 2.5 | 3.7 |
| 700 | 39 | 2.4 | 3.4 |
| 700 | 35 | 2.3 | 3.4 |
| 700 | 31 | 2.2 | 3.1 |
| 700 | 28 | 2.7 | 4.0 |
| 1102 | 42 | 4.6 | 6.7 |
| 1102 | 39 | 5.0 | 7.3 |
| 1102 | 35 | 5.2 | 7.5 |
| 1102 | 34 | 5.3 | 7.6 |

*determined from CO$_2$ measurement

Example 2

A second SiC Refractite I™ candle filter (special order) was mounted to the rig described in Example 1 for used as a flame holder. The flame holder was a closed-ended tube 40 cm long and had an inside diameter of 15.5 mm (0.610 inch), a wall thickness of 2.4 mm (0.09 inch), an average pore size of 30 μm, and a porosity of about 40%. Emissions and pressure drop through the flame holder were measured at 971 MJ/m$^2$/hr (85,500 Btu/ft$^2$/hr) under blue flame and infrared conditions. Pressure drop also was measured at room temperature. The emissions data for assumed thermal efficiencies of 80% are reported in Table 2. The pressure drop data are reported in Table 3.

TABLE 2

| Excess Air* % | CO @ 0% O$_2$ | NO$_x$ ng/J | NO$_x$ @ 3% O$_2$ ppm |
|---|---|---|---|
| 52 | 14 | 4.1 | 5.9 |
| 49 | 9 | 4.6 | 6.7 |
| 47 | 9 | 4.5 | 6.6 |
| 39 | 9 | 5.0 | 7.3 |
| 33 | 10 | 5.1 | 7.4 |
| 30 | 8 | 5.2 | 7.6 |
| 27 | 9 | 5.8 | 8.4 |

*determined from CO$_2$ measurement

EXAMPLE 3

A third SiC Refractite I™ candle filter (grade SF 65) was mounted to the rig described in Example 1 for use as a flame holder. The flame holder was a closed-ended tube 39 cm long and had an inside diameter of 12.7 mm, a wall thickness of 2.3 mm (0.09 inches), an average pore size of 45 μm, and a porosity between 40% and 50%. The pressure drop through the flame holder was measured at room temperature and at 998 MJ/m$^2$/hr (88,000 Btu/ft$^2$/hr) under blue flame and infrared conditions. These data are reported in Table 3. Table 4 reports pressure drop and emissions data measured while operating the flame holder at 998 MJ/m$^2$/hr and an assumed thermal efficiency of 80%.

TABLE 3

| | Example 1 Pressure Drop | | Example 2 Pressure Drop | | Example 3 Pressure Drop | |
|---|---|---|---|---|---|---|
| Condition | Pa | in. H$_2$O | Pa | in. H$_2$O | Pa | in. H$_2$O |
| Room Temperature | 174 | 0.70 | 75 | 0.30 | 55 | 0.22 |
| Firing, Blue Flame | n/a | n/a | 162 | 0.65 | 124 | 0.50 |
| Firing, Infrared | 796$^+$ | 3.20$^+$ | 448$^+$ | 1.80$^+$ | 174–199 | 0.70–0.80 |

TABLE 4

| Flame Condition | Excess Air* % | CO @ 0% O$_2$ ppm | NO$_x$ ng/J | Pressure Drop Pa | Pressure Drop in. H$_2$O |
|---|---|---|---|---|---|
| Blue | 55.4 | 4 | 4.5 | 114 | 0.46 |
| Blue | 51.8 | 5 | 5.3 | 114 | 0.46 |
| Blue | 46.3 | 5 | 4.9 | 137 | 0.55 |
| Mixed | 42.8 | 5 | 4.7 | 199 | 0.80 |
| Infrared | 34.9 | 5 | 4.2 | 224 | 0.90 |
| Infrared | 28.9 | 5 | 3.9 | 224 | 0.90 |
| Infrared | 30.0 | 6 | 4.8 | 224 | 0.90 |

*determined from CO$_2$ measurement

The Examples show that flame holders of the present invention can provide very low pollutant emissions under blue flame and infrared condition. For example, the data show that NO$_x$ levels of less than about 7.5 ppm are readily achievable. In some cases, NO$_x$ production can be as low as 3 ppm. These NO$_x$ levels compare to California's projected maximum 1996 NO$_x$ levels of 10 ppm to 15 ppm at 3% O$_2$. In addition, the present invention can provide CO levels of less than 10 ppm. These CO levels compare to projected CO limits of 58 ppm @ 0% O$_2$. The low emissions may be due to the high emissivity (>0.9) and absorptivity of the SiC-based material used to make the flame holders tested in the Examples. Under infrared conditions, these properties provide rapid flame quenching followed by highly efficient energy emission in the infrared region. This effect appears to reduce the formation of prompt NO$_x$ (initiated by a reaction between atmospheric nitrogen and hydrocarbon fuel fragments, particularly under fuel-rich conditions) and thermal NO$_x$ (formed by a reaction between atmospheric oxygen and atmospheric nitrogen, particularly at flame temperatures above 2800° F.-this reaction is known as the Zeldovich reaction).

Data gathered in the Examples also show that flame holders of the present invention with properly selected pore size and wall thickness can produce pressure drops below 250 Pa. Such flame holders are readily compatible with induced draft heating units that are popular as residential furnaces. Embodiments of the present invention that produce higher pressure drops are compatible with forced draft heating units in which pressure drop across the flame holder is not a large concern.

In addition to low pollutant emissions and low pressure drop, the preferred SiC-based material used for flame holders of the present invention provides other benefits. For example, the material's moderate thermal conductivity helps prevent flashbacks. This property was demonstrated in Example 1. In addition, the SiC-based material has a high thermal shock resistance. As a result, the flame holders of the present invention can withstand frequent thermal cycling.

A side benefit of using a flame holder of the present invention is noise reduction. The random distribution of pores on the surface of a flame holder evenly distributes the fuel/air mixture over a large surface. This reduces the velocity of gases through any one pore and in any one direction. As a result, flame holders of the present invention can burn fuel more quietly than prior art flame holders.

The invention is not limited to the particular embodiments shown and described herein. Various changes and modifications may be made without departing from the spirit or scope of the claimed invention.

We claim:

1. A heating unit, comprising:
   (a) a flame holder having a plurality of randomly distributed pores, wherein the flame holder comprises at least about 50 wt % ceramic particles that have an emissivity of at least about 0.7 bonded together with a ceramic bonding phase selected from the group consisting of mullite, cordierite, lithium aluminosilicate, titanium silicates, borosilicates, yttrium aluminosilicates, barium osumilite, lithium aluminosilicate glass, magnesium aluminosilicate glass, aluminosilicate glass, titanium silicate glass, borosilicate glass, yttrium aluminosilicate glass, and mixtures thereof,
   (b) means for conveying a fuel/air mixture to the flame holder,
   (c) means for igniting the fuel/air mixture so it forms a flame in proximity to the flame holder,
   (d) means for transferring heat from the flame to a heat transfer medium, and
   (e) means for exhausting combustion products from the heating unit.

2. The heating unit of claim 1, wherein the ceramic particles have an emissivity of at least about 0.8.

3. The heating unit of claim 1, wherein the ceramic particles are selected from the group consisting of SiC, $Si_3N_4$, $SiO_2$, TiC, NiO, FeO, $Fe_2O_3$, and mixtures thereof.

4. The heating unit of claim 1, wherein the ceramic particles are SiC.

5. The heating unit of claim 1, wherein the flame holder has a porosity of about 30% to about 50% and an average pore size of at least about 30 μm.

6. The heating unit of claim 1, wherein the flame holder has a wall thickness less than about 4 mm.

7. The heating unit of claim 1, wherein the flame holder has an average pore size of at least about 45 μm and a wall thickness less than about 2.5 mm.

8. The heating unit of claim 1, wherein the ceramic particles are SiC and the flame holder has a porosity of about 30% to about 50%, an average pore size of at least about 30 μm, and a wall thickness less than about 4 mm.

9. A method for burning a fuel, comprising the steps of:
   (a) directing a fuel/air mixture through a flame holder having a plurality of randomly distributed pores, wherein the flame holder comprises at least about 50 wt % ceramic particles that have an emissivity of at least about 0.7,
   (b) burning the fuel/air mixture to form a flame in proximity to the flame holder,
   whereby the flame and flame holder interact to produce emissions of less than about 10 ng/J $NO_x$.

10. The method of claim 9, wherein the ceramic particles have an emissivity of at least about 0.8.

11. The method of claim 9 wherein the ceramic particles are selected from the group consisting of SiC, $Si_3N_4$, $SiO_2$, TiC, NiO, FeO, $Fe_2O_3$, and mixtures thereof.

12. The method of claim 9, wherein the ceramic particles are SiC.

13. The method of claim 9, wherein the flame holder further comprises a ceramic bonding phase selected from the group consisting of mullite, cordierite, lithium aluminosilicate, titanium silicates, borosilicates, yttrium aluminosilicates, barium osumilite, lithium aluminosilicate glass, magnesium aluminosilicate glass, aluminosilicate glass, titanium silicate glass, borosilicate glass, yttrium aluminosilicate glass, and mixtures thereof.

14. The method of claim 9, wherein the flame holder has a porosity of about 30% to about 50% and an average pore size of at least about 30 μm.

15. The method of claim 9, wherein the flame holder has a wall thickness less than about 4 mm.

16. The method of claim 9, wherein the flame holder has an average pore size of at least about 45 μm and a wall thickness less than about 2.5 mm.

17. The method of claim 9, wherein the fuel/air mixture is burned under blue flame conditions.

18. The method of claim 9, wherein the fuel/air mixture is burned under infrared conditions.

* * * * *